W. J. ADAMS.
COMBINED FERTILIZER DISTRIBUTER AND SEEDER.
APPLICATION FILED APR. 1, 1910.

971,338.

Patented Sept. 27, 1910.

3 SHEETS—SHEET 1.

W. J. ADAMS.
COMBINED FERTILIZER DISTRIBUTER AND SEEDER.
APPLICATION FILED APR. 1, 1910.

971,338.

Patented Sept. 27, 1910.

3 SHEETS—SHEET 2.

WITNESSES

INVENTOR

William James Adams by ___ Attorney

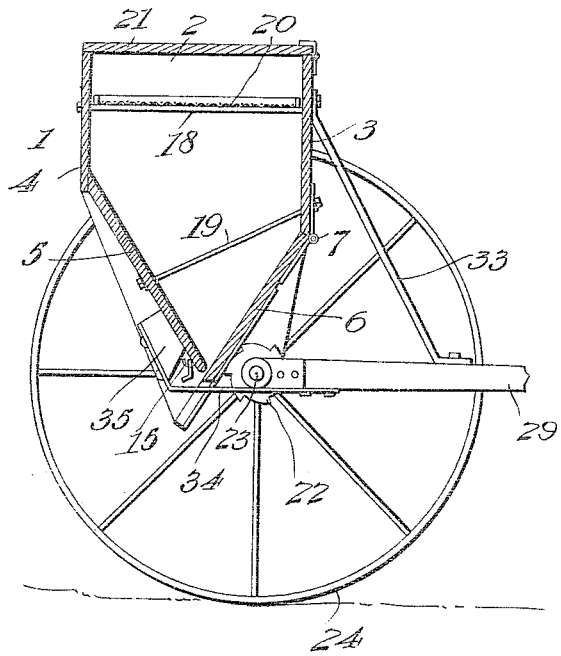
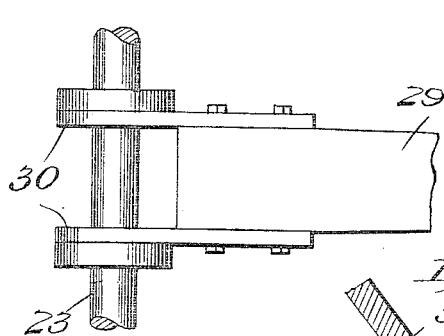
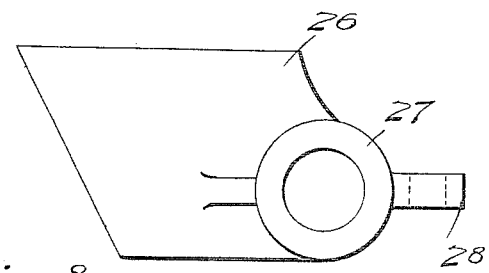
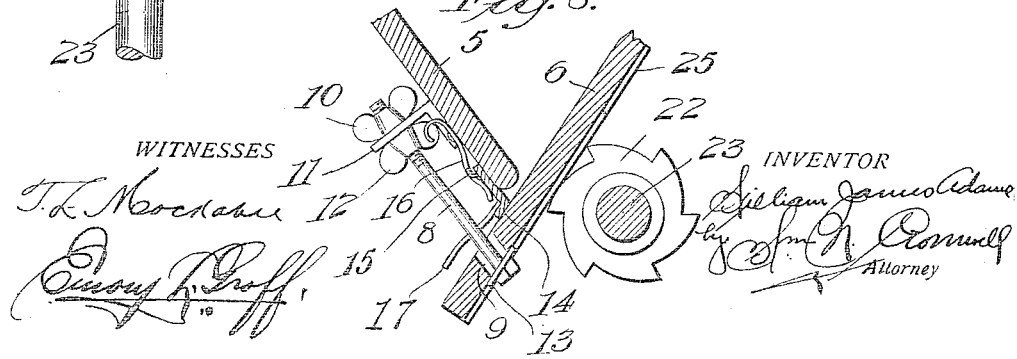

UNITED STATES PATENT OFFICE.

WILLIAM JAMES ADAMS, OF COCHRANTON, PENNSYLVANIA.

COMBINED FERTILIZER-DISTRIBUTER AND SEEDER.

971,338.   Specification of Letters Patent.   Patented Sept. 27, 1910.

Application filed April 1, 1910. Serial No. 552,853.

*To all whom it may concern:*

Be it known that I, WILLIAM J. ADAMS, a citizen of the United States, residing at Cochranton, in the county of Crawford and State of Pennsylvania, have invented certain new and useful Improvements in Combined Fertilizer-Distributers and Seeders; and I do hereby declare the following to be a full, clear, and exact description of the invention, such as will enable others skilled in the art to which it appertains to make and use the same.

This invention relates to improvements in combined fertilizer distributers and seeders.

The main and primary object of the present invention is the provision of a machine which is so constructed as to provide at low cost a reliable implement designed for spreading on land, lime, plaster, guano, ashes, compost, or other similar fertilizing material, the construction of the machine being such as to adapt it also for sowing broadcast in a reliable and effective manner oats and other coarse grains.

A further object of the present invention is to provide a machine of the character mentioned the working parts of which are located wholly outside of the box or receptacle which carries the material to be distributed, whereby the material is prevented contacting with any of said parts, and rust or corrosion, which frequently interfere with the free and easy working of similar devices wherein the working parts are located in the box or receptacle, are avoided.

The present invention further contemplates the provision of a machine of exceedingly simple construction, by which but a minimum number of parts are necessary. This renders the machine light in weight, and, therefore, easily transported, and enables the machine to be made of more than ordinary width, thus permitting ground to be covered at a rapid rate without unduly exerting the team.

The invention also seeks to provide a novel construction of box or receptacle for the material to be distributed having features of construction which insure complete emptying of the box or receptacle.

With these general objects in view, and others which will appear as the nature of the improvements is better understood, the invention consists substantially in the novel construction, combination and arrangement of parts hereinafter fully described, illustrated in the accompanying drawings, and pointed out in the appended claims.

Figure 1:
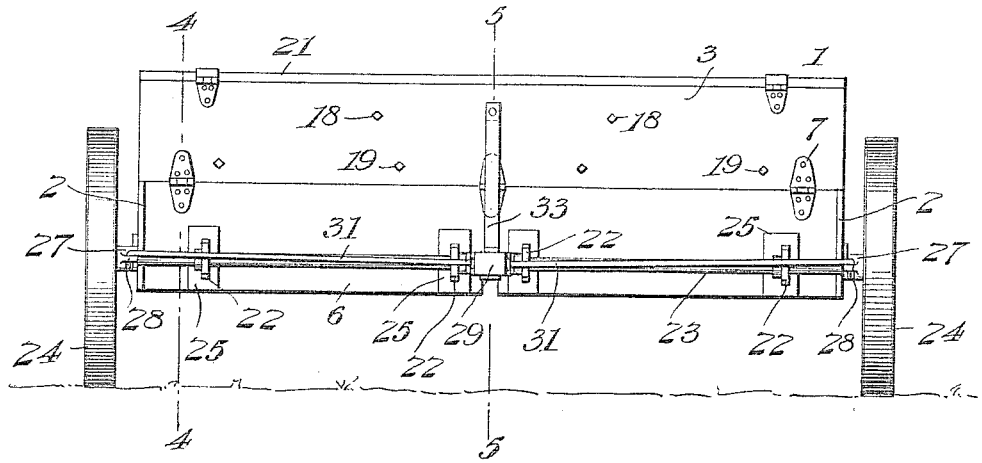
Figure 2:
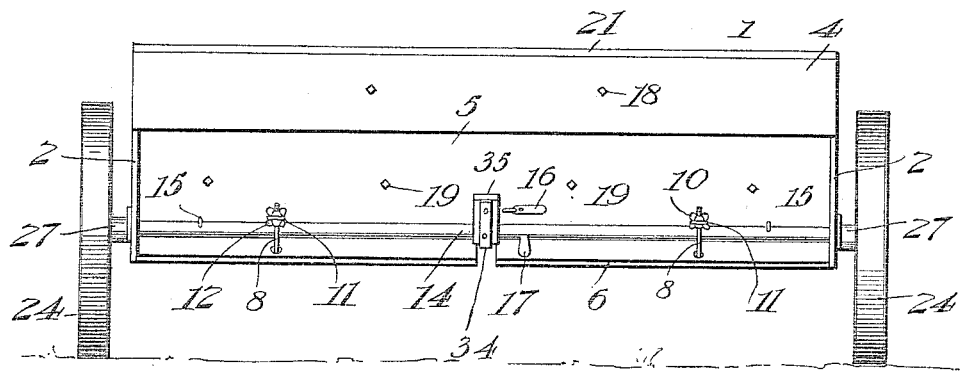
Figure 3:
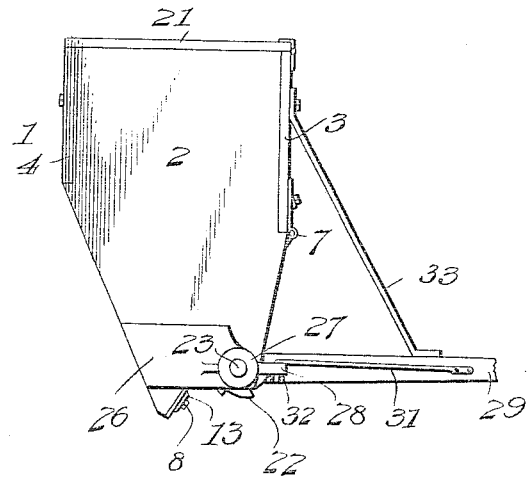
Figure 4:
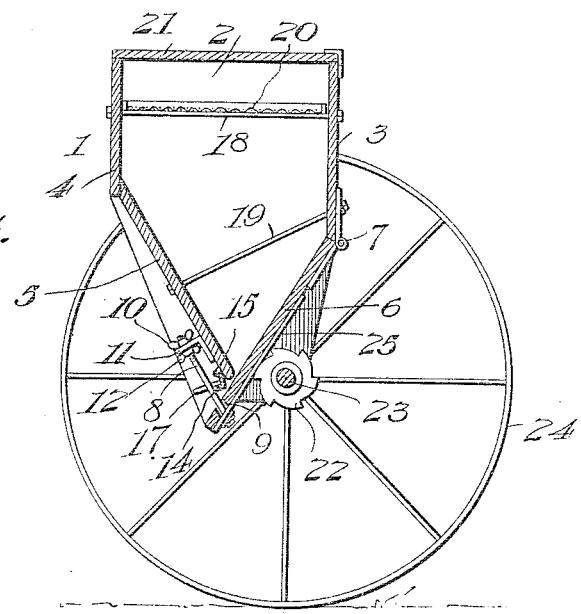

In the drawings—Figure 1 is a front elevation of a combined fertilizer distributer and seeder constructed in accordance with and embodying the principles of the present invention. Fig. 2 is a rear elevation thereof. Fig. 3 is an end elevation, the wheels being removed. Fig. 4 is a transverse sectional view on the line 4—4, Fig. 1. Fig. 5 is a similar view on the line 5—5, Fig. 1. Fig. 6 is a fragmentary plan view illustrating the manner of connecting the tongue or draft pole to the axle of the machine. Fig. 7 is a detail elevation of one of the end bearings. Fig. 8 is a transverse sectional view, on an enlarged scale, of the lower end of the box or receptacle, the line of section being taken through one of the adjusting rods by which the degree of movement of the shaker board is regulated.

Referring in detail to the drawings, the numeral 1 designates the box or receptacle for the material to be distributed. Preferably, this box is formed of wood, but any other suitable material may be employed.

The box 1 is in the form of a hopper, comprising end pieces 2; a front 3, and a back 4. It will be noted that the end pieces 2 are provided with converging edges, said edges extending from the lower edges of the front 3 and back 4 to a point some distance below the lower edges of the front and back, and arranged between said depending portions of the ends 2 is a stationary back board 5, a shaker board 6 being hingedly connected to the lower edge of the front 3 but of sufficient width to extend beyond the lower edge of the back board 5. The latter and the shaker board 6 constitute the bottom of the box or receptacle 1, and by reason of the hinged connection, illustrated at 7, of the shaker board 6 this board is movable relatively to the back board 5 in order to provide a discharge opening between said back board 5 and the shaker board 6. It is between these boards that the material to be distributed is permitted to gravitate.

In order to regulate the degree of movement of the shaker board 6 in relation to the back board 5, adjusting rods 8 are employed. Any number of these may be used, but two of these will suffice. These rods are in the form of bolts the heads of which are arranged at the outside of the shaker board 6, suitable openings 9 of sufficient size being formed in the shaker board 6 to permit the latter freely moving on said adjusting rods. The threaded ends of these rods are provided at their extremities with adjusting nuts 10 which take against angle clips 11 suitably connected to the back board 5, as by screws or bolts, and arranged upon the adjusting rods 8, at the underside of said clips 11, are lock nuts 12 through the medium of which, when the adjusting rods 8 have been moved to the desired position, the adjusting rods are held locked against movement to the angle clips 11. Surrounding the adjusting rods 8, adjacent their heads, are washers 13, which washers are interposed between the heads of the rods and the outer surface of the shaker board 6, and these washers serve to prevent the heads of the adjusting rods wearing upon the shaker board. It will thus be seen that the shaker board 6 is capable of free movement on the adjusting rods 8, both toward and away from the lower edge of the back board 5, but the washers 13 and the heads of said rods limit the movement of the shaker board 6 in an outward direction. Hence, according to the adjustment of the rods 8 is the degree of opening between the shaker board 6 and the back board 5 regulated, and by adjusting the nuts 10 and 12 the rods 8 may be so moved as to position the shaker board 6 nearer to or farther from the back board 5.

When the device is employed as a fertilizer distributer the fertilizer will usually remain in the box or receptacle unless the shaker board 6 is being agitated. By reason of this, even though the space between the shaker board 6 and the back board 5 may be fully open, as when the machine is at rest, the fertilizer will not be distributed, but there are conditions under which it is desirable to effect a closure of this space, without the necessity of drawing the shaker board 6 into immediate contact with the back board 5, as by the operation of the adjusting rods 8. An instance of such conditions is when the device is being employed for distributing or sowing grain.

If it be desired to refill the box or receptacle 1, there being a small proportion of grain remaining, the adding of the grain to that already in the box has a tendency to push the grain in the bottom of the box through the discharge opening. In order to close this opening at this time, a shutter 14 is arranged at the outer side of the back board 5, being suspended on hooks 15, or their equivalent, carried by said back board. Normally, this shutter, which is in the form of an angle iron, hangs away from the back board 5, and uncovers the lower edge thereof. To close the discharge opening the shutter 14 is swung into contact with the back board 5, whereby the lower flange of the shutter is also brought into contact with the shaker board 6, as illustrated by full lines in Fig. 8, and when swung to this position it is obvious that the discharge opening of the box or receptacle 1 is wholly closed, and the contents thereof prevented passing therefrom.

To sustain the shutter 14 in closed position a pivoted catch 16 is carried by the back board 5, which catch, when swung to a substantially vertical position, projects at its end over the vertical flange of the shutter, and in this position holds the latter closed. When, however, the catch 16 is disengaged from the shutter 14 the shutter again swings away from the back board 5, and uncovers the discharge opening of the box or receptacle 1. If desired, the shutter 14 may be provided with a handle 17 to facilitate its movement.

That the box or receptacle 1 may be properly strengthened, stay bolts 18 extend from the front to the back thereof, and similar bolts 19 are also connected to the back board 5 and the front board 3, whereby to hold the back board 5 in rigid position. The box or receptacle 1 is also provided with a screen 20, which may be of any suitable construction, this screen being positioned in the upper portion of the box or receptacle, and serving to prevent foreign substances passing down through the box or receptacle with the fertilizer or grain to be distributed. The box or receptacle 1 is also provided with a suitable cover 21, which is preferably hinged to the body.

In order that the shaker board 6 may be properly actuated to agitate the contents of the box or receptacle, and cause the same to freely gravitate, a plurality of cams 22 is employed. These cams are carried by, and rigidly connected to, an axle 23 upon the ends of which bearing wheels 24 are mounted. The wheels are so connected to the axle 23 as to cause the latter to rotate when the wheels rotate, and the box or receptacle 1 is mounted in such relation to the axle 23 that the cams 22 will contact with the shaker board, when the latter is properly moved by adjusting the rods 8 to form the discharge opening at the bottom of the box. Obviously, as the cams rotate the same contact with the shaker board 6, agitating the latter, and causing the board to move toward and from the lower edge of the back board 5. The cams 22 work upon wear strips 25, which strips are arranged transversely of the shaker board 6 at points immediately opposite to said cams. Consequently, the jar of the shaker board upon the cams is taken up by these wear strips.

Each of the box ends 2 has mounted thereon a bearing casting 26, which castings are each provided with a sleeve 27, said sleeves receiving the ends of the axle 23, and projecting forwardly from said sleeves 27 are perforated lugs 28, for a purpose to be presently explained. By reason of the end castings 26, it will be seen that the axle 23 has no direct connection with the box or receptacle 1, but passes through the sleeves 27 of said castings, and it will also be noted at this point that none of the working parts of the machine are within the box or receptacle 1, being wholly at the exterior thereof. This prevents contact of the material within the box with these working parts, and obviously prevents deterioration of or injury to said parts because of such contact. Therefore, the working parts are free from rust or corrosion which commonly arises where the working parts of fertilizer distributers are in position to be contacted by the fertilizing material.

To transport the hereindescribed machine a tongue or draft pole 29 is employed. This tongue projects forwardly from the axle 23, and is arranged substantially at its central portion. To connect the tongue with the axle the former is provided at its rear end, and at its sides, with parallel straps 30, said straps being bolted at their forward ends to the tongue, but provided with perforations at their rear ends through which the axle 23 passes. To hold the tongue 29 at the middle portion of the axle 23, the inner cams 22 are so positioned upon the axle 23 as to be in close proximity to the straps 30. Inasmuch as these cams are fixed to the axle 23, it will be seen that the tongue 29 is precluded moving along the axle.

Laterally-extending brace rods 31 are also connected to the tongue 29, the outer extremities of said rods being bent and engaging the perforated lugs 28 carried by the end castings 26. These bent ends of the brace rods 31 are held in said perforated lugs by spring cotters 32. A brace 33 is also connected to the tongue 29 and the front board 3 of the box, and arranged at the underside of the tongue is a draft strap 34, the rear end of which is bent upwardly and bolted to a block 35 arranged at the outside of the back board 5. By reason of the brace rods 31 and 33, and the draft strap 25, it will be evident that the strain incident to transportation of the machine will be evenly distributed, the draft being applied to the rear side of the box or receptacle 1, as well as to the end castings 26, thus precluding the draft being centered upon the axle 23 at the point of connection of the straps 30 therewith.

In the operation of the herein-described machine, the material to be distributed, whether it be fertilizer or grain, is introduced to the box or receptacle 1, the screen 20 preventing foreign substances passing beyond the point where it is applied in the box. If the shaker board 6 is in contact with the back board 5, the adjusting rods 8 are properly manipulated to position the shaker board at the point which shall constitute the limit of the outward movement of the shaker board from the back board 5. This determines the degree of the discharge opening. As the machine moves forwardly the cams 22 work upon the wear strips 25, causing a rapid vibration of the shaker board, and thereby compelling the material to pass downwardly thereon. So long as the machine is in movement this agitation of the shaker board 6 continues. If the conditions require only temporary closure of the discharge opening, the shutter 14 is swung against the back board 5 and the shaker board 6, and locked in such position, and it will therefore be seen that this precludes the necessity of adjustment of the rods 8. However, by properly manipulating the nuts 10 and 12 the adjusting rods 8 may be drawn upwardly through the angle clips 11, thereby raising the shaker board 6 into contact with the back board 5, and holding the shaker board in such position. This locks the shaker board against the back board, preventing the cams 22 acting upon the shaker board, and enabling the machine to be transported without causing discharge of the material from the box or receptacle 1. In other words, when the shaker board is so positioned, the machine is out of gear.

Having thus described the invention, what is claimed as new, and desired to be secured by Letters Patent, is:

1. In a machine of the class described, the combination with a hopper, of a shaker board arranged at one side thereof and movable relatively thereto, means for actuating said shaker board, and adjustable supporting means arranged at the side of the hopper opposite to the shaker board and upon which said shaker board is mounted for movement, said supporting means coöperating with said shaker board for controlling the position of the shaker board in relation to said actuating means.

2. In a machine of the class described, the combination with a hopper, of a shaker board arranged at one side thereof and movable relatively thereto, means for actuating said shaker board, and adjustable supporting devices arranged at the side of the hopper opposite to the shaker board and upon which said shaker board is mounted and freely movable, said supporting devices coöperating with said shaker board for controlling the position of the shaker board in relation to said actuating means.

3. In a machine of the class described, the combination with a hopper, of a shaker board associated therewith and movable relatively thereto, means for actuating said shaker board, and headed adjusting devices carried by the hopper, said shaker board being mounted upon said adjusting devices but limited in its movement thereon by the heads of said devices.

4. In a machine of the class described, the combination with a hopper, of a shaker board associated therewith and movable relatively thereto, means for actuating said shaker board, and adjusting devices carried by the hopper and connected to said shaker board for controlling the position of the shaker board in relation to said actuating means, and thereby regulating the discharge of the material from said hopper, said shaker board freely movable upon said adjusting devices.

5. In a machine of the class described, the combination with a hopper, of a shaker board hingedly-connected thereto, means for actuating said shaker board, an adjusting rod upon which said shaker board is supported and freely movable, and means for adjustably connecting said rod to said hopper.

6. In a machine of the class described, the combination with a hopper, of a shaker board hingedly connected thereto, means for actuating said shaker board, a headed adjusting rod upon which the shaker board is movably mounted but limited in its movement by the head of said rod, and means for connecting said rod to said hopper.

7. In a machine of the class described, the combination with a hopper, of a shaker board hingedly connected thereto, means for actuating said shaker board, an adjusting rod upon which said shaker board is freely movable, a clip for connecting said rod to said hopper, and means carried by said adjusting rod and coöperating with said clip to permit adjustment of said rod.

8. In a machine of the class described, the combination with a hopper having inclined sides, one of said sides being movable, of means at the exterior of the said hopper for actuating said movable side, and an adjustable rod associated with said movable side for supporting and adjusting the latter in relation to the hopper for controlling the discharge of the contents therefrom.

9. In a machine of the class described, the combination with a hopper, of a shaker board associated therewith and movable relatively thereto, means for actuating said shaker board, and a swinging shutter carried by the hopper and coöperating with the shaker board to close the hopper against discharge of its contents.

10. In a machine of the class described, the combination with a hopper, of a shaker board associated therewith and movable relatively thereto, means for actuating said shaker board, a shutter carried by the hopper and coöperating with the shaker board to close the hopper against discharge of its contents, said shutter being normally out of contact with said shaker board, and means for holding the shutter in contact with the shaker board.

11. In a machine of the class described, the combination with a hopper, said hopper having an inclined side, of a shaker board hingedly connected to said hopper and coöperating with said inclined side to control the discharge of the contents from the hopper, means carried by said inclined side and upon which said shaker board is mounted and held in movable relation to said inclined side, and means for actuating said shaker board.

12. In a machine of the class described, the combination with a hopper, said hopper having an inclined side, of a shaker board hingedly connected to said hopper and coöperating with said inclined side to control the discharge of the contents from the hopper, an adjusting rod carried by said inclined side and upon which said shaker board is mounted and held in movable relation to said inclined side, and means for actuating said shaker board.

13. In a machine of the class described, the combination with a hopper, said hopper having an inclined side, of a shaker board hingedly connected to said hopper and coöperating with said inclined side to control the discharge of the contents from the hopper, an adjusting rod carried by said inclined side and upon which said shaker board is mounted and held in movable relation to said inclined side, and a cam device for actuating said shaker board.

14. In a machine of the class described, the combination with a hopper, said hopper having an inclined side, of a shaker board hingedly connected to said hopper and coöperating with said inclined side to control the discharge of the contents from the hopper, an adjusting rod carried by said inclined side and upon which said shaker board is mounted and held in movable relation to said inclined side, a cam device for actuating said shaker board, and a wear strip carried by the shaker board and upon which said cam device works.

15. In a machine of the class described, the combination with a hopper, of a shaker board hingedly connected thereto for effecting discharge of the contents of the hopper, a supporting device carried by the hopper and upon which said shaker board is adapted to slide, an axle upon which the hopper is mounted, and means carried by said axle for actuating said shaker board.

16. In a machine of the class described, the combination with a hopper, of a shaker board hingedly connected thereto for effecting discharge of the contents of the hopper, a supporting device carried by the hopper and upon which said shaker board is adapted to slide, an axle upon which the hopper is mounted, and a cam device carried by said axle for actuating said shaker board.

17. In a machine of the class described, the combination with a hopper, of a hinged shaker board arranged at one side thereof for effecting discharge of the contents of the hopper, a supporting device arranged at the opposite side of the hopper and engaged with said shaker board, the latter being mounted for limited movement on said supporting device, and means for actuating said shaker board.

18. In a machine of the class described, the combination with a hopper, of a hinged shaker board arranged at one side thereof for effecting discharge of the contents of the hopper, a supporting device arranged at the opposite side of the hopper and engaged with said shaker board, the latter being mounted for limited movement on said supporting device, and a cam device for actuating said shaker board.

19. In a machine of the class described, the combination with a hopper, of a hinged shaker board arranged at one side thereof for effecting discharge of the contents of the hopper, said shaker board coöperating with the opposite side of the hopper to close the latter, a supporting device arranged on the hopper at a point opposite the shaker board and with which the latter is engaged, said shaker board being mounted for limited movement on said supporting device, means for actuating said shaker board, and a shutter carried by the hopper and coöperating with the shaker board to close the hopper when the shaker board is at the limit of its movement in one direction.

In testimony whereof I affix my signature, in the presence of two witnesses.

WILLIAM JAMES ADAMS.

Witnesses:
ROBERT C. CURTIS,
JOHN L. AXTELL.